United States Patent
Matthias et al.

(10) Patent No.: US 10,788,576 B2
(45) Date of Patent: Sep. 29, 2020

(54) DISTANCE MEASURING SYSTEM AND METHOD, AND ROBOT SYSTEM USING SAME

(71) Applicant: ABB Schweiz AG, Baden (CH)

(72) Inventors: Bjoern Matthias, Bad Schoenborn (DE); Richard Roberts, Gilching (DE); Andreas Decker, Darmstadt (DE); Christoph Byner, Mannheim (DE); Nicolas Lehment, Munich (DE)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 16/690,162

(22) Filed: Nov. 21, 2019

(65) Prior Publication Data

US 2020/0088865 A1    Mar. 19, 2020

Related U.S. Application Data

(63) Continuation of application No. PCT/EP2018/061354, filed on May 3, 2018.

(30) Foreign Application Priority Data

May 24, 2017   (DE) .......................... 10 2017 111 367

(51) Int. Cl.
*G01S 13/34* (2006.01)
*B25J 9/16* (2006.01)
(Continued)

(52) U.S. Cl.
CPC .......... *G01S 13/343* (2013.01); *B25J 9/1694* (2013.01); *B25J 13/088* (2013.01); *G01S 7/352* (2013.01);
(Continued)

(58) Field of Classification Search
CPC .... G01S 13/343; G01S 13/345; G01S 13/583; G01S 13/584; G01S 13/88; G01S 13/887; G01S 13/888
See application file for complete search history.

(56) References Cited

U.S. PATENT DOCUMENTS 5,341,144 A  *  8/1994  Stove ................... G01S 7/4056
                                                        342/70
2013/0207834 A1    8/2013  Mizutani et al.
(Continued)

FOREIGN PATENT DOCUMENTS

| DE | 102013201865 A1 | 8/2013 |
|---|---|---|
| DE | 102015109463 A1 | 12/2016 |
| EP | 2631612 A2 | 8/2013 |

OTHER PUBLICATIONS

Anonym: "Industrieroboter—Sicherheitsanforderungen—Teil 1: Roboter (ISO 10218-1:2011); Deutsche Fassung EN ISO 10218-1:2011", Deutsche Norm, Jan. 1, 2012 (Jan. 1, 2012), pp. 1-55, XP055474482.

*Primary Examiner* — Peter M Bythrow
(74) *Attorney, Agent, or Firm* — Leydig, Voit & Mayer, Ltd.

(57) ABSTRACT

A distance measuring system includes: at least one emitter, which emits a frequency-variable scanning signal; at least one receiver; and an analysis unit for computing a distance to an object reflecting the scanning signal on the basis of a difference between the frequencies of the emitted and the received scanning signal. The rate of change of the frequency of the scanning signal in a first operating mode of the distance measuring system has a first finite value. The rate of change of the frequency in a second operating mode has a second finite value. The analysis unit is configured to compute a first distance on the basis of a frequency difference ascertained in the first operating mode, to compute a second distance on the basis of a frequency difference
(Continued)

ascertained in the second operating mode, and to evaluate the correspondence between first and second computed distance.

17 Claims, 2 Drawing Sheets

(51) Int. Cl.
*B25J 13/08* (2006.01)
*G01S 7/35* (2006.01)
*G01S 7/40* (2006.01)
*G01S 13/58* (2006.01)
*G01S 13/88* (2006.01)

(52) U.S. Cl.
CPC .......... *G01S 7/4004* (2013.01); *G01S 13/345* (2013.01); *G01S 13/584* (2013.01); *G01S 13/881* (2013.01)

(56) References Cited

U.S. PATENT DOCUMENTS

| | | |
|---|---|---|
| 2013/0213132 A1 | 8/2013 | Wegemann |
| 2017/0307727 A1* | 10/2017 | Goda ...................... G01S 7/352 |
| 2018/0164145 A1 | 6/2018 | Daufeld et al. |

* cited by examiner

DISTANCE MEASURING SYSTEM AND METHOD, AND ROBOT SYSTEM USING SAME

CROSS-REFERENCE TO RELATED APPLICATIONS

The present application is a continuation of International Application No. PCT/EP2018/061354, which was filed on May 3, 2018 and published on Nov. 29, 2018 as International Publication No. WO 2018/215185. The International Application claims priority to German Patent Application No. DE 10 2017 111 367.3, which was filed on May 24, 2017. The prior applications and the prior publication are hereby incorporated by reference herein.

FIELD

The present invention relates to a distance measuring system, a distance measuring method, and a robot system in which these are usable.

BACKGROUND

For robots to cooperate with human employees, it is of importance that objects with which a robot could collide in the course of a movement are reliably detected and the movement of the robot can be stopped in a timely manner or at least slowed enough that an injury to an employee due to the movement of the robot can be reliably precluded. The requirements which a robot system has to meet to be considered safe in this respect are defined in norms such as ISO 13849-1:2015, ISO 10218-1:2011, or ISO 10218-2:2011 and require that a malfunction of a sensor used to acquire a proximity of the robot to persons has to be reliably detectable, so that the robot can be stopped in case of fault.

One possibility for detecting a malfunction is the use of redundant sensors. If the acquisition results thereof do not correspond, there is reason to assume that at least one sensor is malfunctioning, and the robot is stopped or put into a safe state, for example in a state having reduced speed.

The required duplication of the sensors makes such an approach costly, moreover problems can result in the housing of the sensors, since double wiring is required and hardware embodied in doubled form has to be synchronized. The farther away these sensors embodied in doubled form are from one another, the greater is the risk that different acquisition results of the sensors are not to be attributed to a malfunction, but rather to the incomplete overlap of the spatial regions monitored by the sensors.

SUMMARY

In an embodiment, the present invention provides a distance measuring system including: at least one emitter, which emits a frequency-variable scanning signal, in particular a radar signal; at least one receiver; and an analysis unit for computing a distance to an object reflecting the scanning signal on the basis of a difference between the frequencies of the emitted and the received scanning signal. The rate of change of the frequency of the scanning signal in a first operating mode of the distance measuring system has a first finite value. The rate of change of the frequency in a second operating mode has a second finite value. The analysis unit is configured to compute a first distance on the basis of a frequency difference ascertained in the first operating mode, to compute a second distance on the basis of a frequency difference ascertained in the second operating mode, and to evaluate the correspondence between first and second computed distance.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
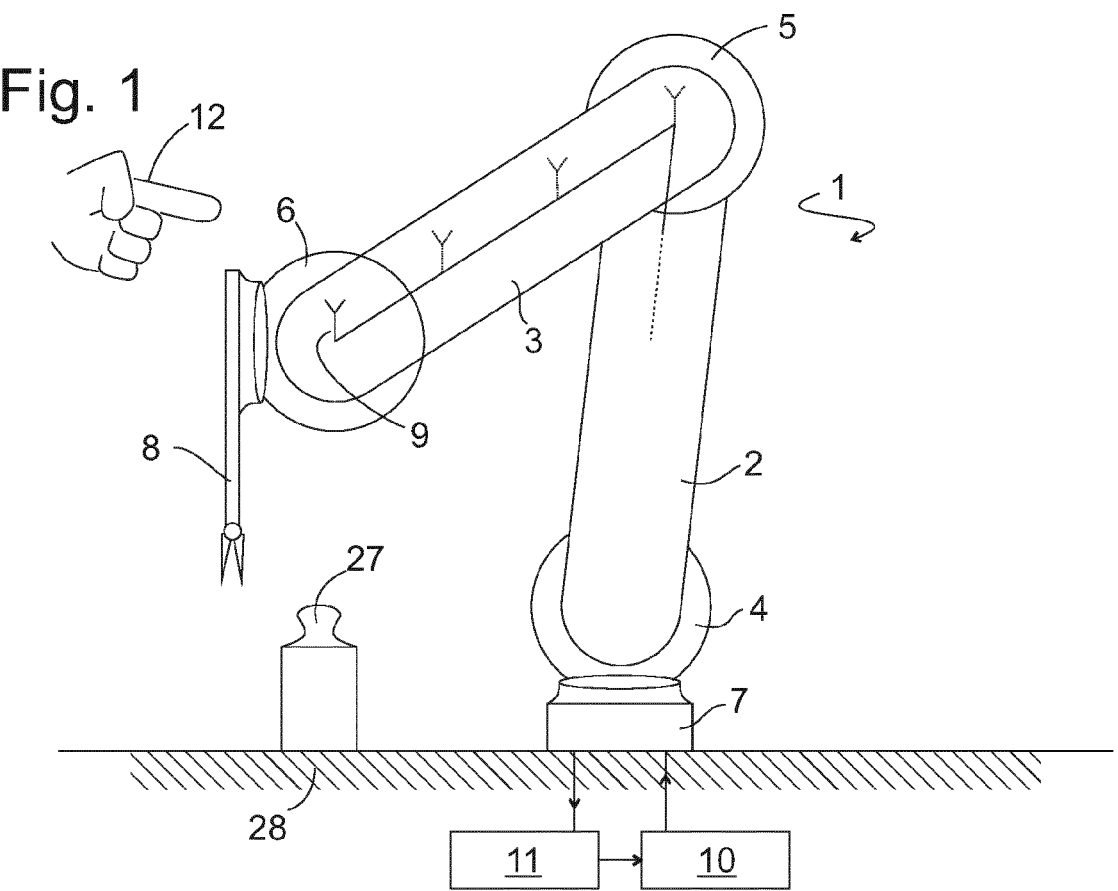
FIG. 1 schematically illustrates a robot system, according to an embodiment.

The present invention provides, in an embodiment, a distance measuring system and method, which enable the required reliable malfunction detection in simple and cost-effective ways.

These advantages can be achieved through a distance measuring system having an emitter emitting a frequency-variable scanning signal, in particular a radar signal, a receiver, and an analysis unit for computing a distance to an object reflecting the scanning signal on the basis of a difference between the frequencies of the emitted and the received scanning signal, in addition to a first operating mode, in which the rate of change of the frequency of the scanning signal has a first finite value, also supports a second operating mode, in which the rate of change of the frequency has a second finite value, and the analysis unit is configured to compute a first distance on the basis of a frequency difference ascertained in the first operating mode, to compute a second distance on the basis of a frequency difference ascertained in the second operating mode, and to evaluate the correspondence between first and second distance.

Redundant components can be used in the distance measuring system according to the invention; however, this is not required, because, since the function of the system is only evaluated as correct if the frequency difference changes in the expected manner, but the failure of a nonredundant component can at most prevent such a change, a malfunction can also be reliably detected without physical redundancy.

The above discussed advantages can be achieved, on the other hand, by a distance measuring method having the following steps:

a. emitting a scanning signal frequency-variable at a first rate of change;

b. receiving the scanning signal reflected from a monitored object and computing a first distance of the object on the basis of a difference between the frequencies of the emitted and the received scanning signal;

c. emitting a scanning signal frequency-variable at a second rate of change;
d. receiving the scanning signal reflected from the monitored object and computing a second distance of the object on the basis of a difference between the frequencies of the emitted and the received scanning signal;
e. evaluating the correspondence between first and second distance.

There are various options for further processing the result of the evaluation. One is that the analysis unit outputs an error signal if it evaluates the correspondence as inadequate. The control unit of a robot system can then stop any potentially hazardous movement upon receiving the error signal or change into a safe robot operating mode, for example "power force limiting" having reasonable low speeds. Moreover, the error message can be brought to the attention of a user via a suitable user interface, so that the cause of the error can be sought out and remedied if necessary.

Instead of an error signal, in the case of inadequate correspondence, the analysis unit can output an imaginary distance measurement result independent of the ascertained first and second distance, which is sufficiently low to have the control unit of the robot system initiate an immediate stop of any movement or a safe stop.

To ensure the timely acquisition of a malfunction upon the occurrence thereof, a changeover between first and second operating mode is to take place periodically without requiring a user intervention.

In an embodiment, as long as the frequency of the scanning signal changes at a constant rate of change, the difference between the frequencies of the emitted and the received scanning signal is a measure of the runtime of the scanning signal and thus of the distance covered from the emitter to the monitored object and back to the receiver. Times at which the rate of change varies, for example because a limit of the frequency range of the scanning signal is reached, are not suitable for a distance measurement. To minimize these times, if the frequency of the scanning signal varies between a lower and an upper limiting frequency in both operating modes, a changeover between the operating modes is to take place at latest upon reaching one of the limiting frequencies, but possibly even beforehand.

The common limiting frequency can be the upper limiting frequency of the first operating mode and the lower limiting frequency of the second operating mode; in this case, upon the transition from the first to the second operating mode, neither does a frequency jump take place nor does the direction of the frequency change.

However, it is preferable for the two operating modes to share both limiting frequencies. Then either a frequency jump from one limiting frequency to the other takes place upon the transition from one operating mode to the other, or the rate of change changes not only its absolute value, but rather also its sign.

As a byproduct of measurements of the distance to a monitored object which are repeated at various times, the speed of the object in relation to emitter and receiver can be estimated. If this is not equal to zero, the distance then changes between two measurements, and this is to be taken into consideration in the evaluation of the correspondence.

In a simplified case, the maximum deviation between first and second distance, at which the correspondence is still evaluated as adequate, can be predetermined proportionally to a known time interval between two measurements. Alternatively, on the basis of the known speed, the first distance at the point in time of its measurement, and the time interval between the measurements in the first and second operating mode, a first distance can be extrapolated to the point in time of the measurement of the second distance and the correspondence can be evaluated on the basis of the measured second and the extrapolated first distance.

In practice, a scanning signal can be reflected from diverse objects simultaneously. If the distances thereof change from one measurement to another, it can occur that a given spectral component of the reflected scanning signal originates from various objects in successive measurements. To avoid incorrect assignments in such a case, it is helpful if, in step d), among reflected signals originating from various objects, one is only identified as originating from the monitored object if the strength ratio of this one signal can be evaluated as corresponding to the scanning signal emitted in step c) having the strength ratio of the scanning signal received in step b) to the scanning signal emitted in step a).

In the analysis of a reflected scanning signal, the reflected scanning signal can in particular be additively or multiplicatively overlaid with the emitted scanning signal to obtain a low-frequency beat signal, the frequency of which permits an inference about the distance of a reflecting object.

To make the time intervals as small as possible between a measurement in the first operating mode and a measurement in the second operating mode, the frequency of the scanning signal in step a) and in step c) is to be tuned in each case precisely once from a first to a second interval limit.

FIG. 1 shows, schematically and by way of example, a robot system according to an embodiment of the invention. A robot arm 1 comprises at least two arm elements 2, 3, which are connected to a base 7, to one another, or to a tool 8, for example a gripper, respectively, via joints 4, 5, 6, which are pivotable by motors—preferably in two degrees of freedom each. Emitter-receiver units 9 of a distance measuring system can be attached at arbitrary points of the robot arm 1; FIG. 1 shows such an emitter-receiver unit 9 on the joint 6 between the distal arm element 3 and the tool 8; further emitter-receiver units 9 can be distributed along the arm element 3, as indicated by dashed lines in FIG. 1. The joint 5 and the proximal arm element 2, although not shown in the figure, can be equipped in a corresponding manner with emitter-receiver units 9 to monitor the robot arm 1 on its entire length for possible collisions with an object. Further locations for the attachment of emitter-receiver units 9 are also conceivable, for example on the base 7 or in the surroundings of the robot system.

A control unit 10 controls the motors of the joints 4, 5, 6, to move the tool holder and/or a tool 8 guided thereby according to a predetermined working program. An analysis unit 11 is connected to the emitter-receiver unit(s) 9, to acquire the penetration of a foreign body, in particular a body part 12 of a person, who could be injured by contact with the robot arm 1 or the tool guided thereby, into a critical vicinity of the robot arm 1, and to trigger an operational interruption of the robot system if necessary. Control unit 10 and analysis unit 11 can be implemented on the same microprocessor.

In principle, the analysis unit 11 can process signals of an arbitrary number of emitter-receiver units 9 in the same manner in each case. It is therefore sufficient, in an embodiment, if only the interaction of the analysis unit 11 with a single emitter-receiver unit 9 is described in detail hereafter.

The critical vicinity of an emitter-receiver unit 9 can be statically defined as a sphere or a sphere sector of predetermined radius, the center point of which is the emitter-receiver unit 9. In the case of an emitter-receiver unit 9 attached to the joint 4 or the base 7, this radius can be the range of the robot arm 1.

It can also be larger, to have available a minimum reaction time explained in greater detail hereafter. This is because the robot arm cannot move outside its range, but a human could engage suddenly in the space corresponding to the range and collide with the robot if the critical vicinity is restricted to the range.

In the case of a movable emitter-receiver unit 9, the radius can be defined proportionally to a maximum speed of the emitter-receiver unit 9, so that upon penetration of a foreign body into the critical vicinity, a minimum reaction time is available to bring the robot arm 1 to a standstill.

However, in an embodiment, the analysis unit 11 is informed by the control unit 10 about the imminent movement of the emitter-receiver unit 9 according to the predetermined working program, to dynamically adapt the critical vicinity to this movement, for example by the distance under which a foreign body cannot fall being selected as greater in the direction of the movement than in a direction deviating from the movement direction.

To monitor, for example, the joint 6 from all spatial directions in the same manner, in practice multiple emitters, which each emit a scanning signal from the joint 6 in a limited spatial angle, and the spatial angles of which could adjoin and/or also partially overlap one another, and also receivers, which are associated with the emitters and pick up signals reflected from the relevant spatial angles, are required. Both a single pair of emitter and receiver and also a plurality of such pairs can be understood as emitter-receiver unit 9.

Figure 2:
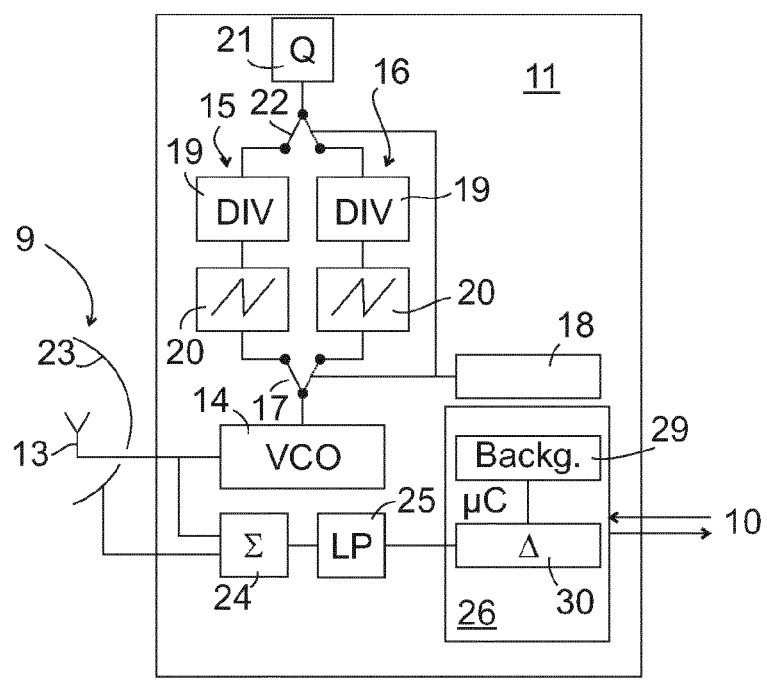
FIG. 2 is a block diagram of a distance measure system used in the robot system, according to an embodiment.

FIG. 2 shows an exemplary block diagram of the distance measuring system. An emitter 13 of the emitter-receiver unit 9, for example a radar or ultrasound emitter, acquires an electrical high-frequency signal from a voltage-controlled oscillator 14, which signal predetermines the frequency of the scanning signal to be emitted by the emitter 13. The output frequency f of the oscillator 14 is related to an applied control voltage U according to f=f0+U(f1−f0), wherein U is assumed to be scaled to the value interval [0, 1] for the sake of simplicity and f0, f1 represent the limiting frequencies of the operation.

In the example shown here, two ramp generators 15, 16 are provided for generating the control voltage U. In a first operating mode of the distance measuring system, the ramp generator 15 is connected via a switch 17 actuated by an operating mode selection unit 18 to the control input of the oscillator 14, in a second operating mode the ramp generator 16 is connected.

The ramp generators 15, 16 according to an embodiment each comprise a frequency divider 19 in a way known per se, which divides the output signal of a fixed-frequency oscillator 21, typically of a quartz oscillator, by a programmable factor d15 or d16, respectively, and a counter 20, which counts periods of an output signal of the frequency divider 19 and therefore supplies an output signal in the form of a ramp which rises linearly from 0 to 1 and upon reaching 1 jumps back to 0, the rising speed of which is inversely proportional to the divider factors d15, d16 of the frequency divider 19.

A second switch 22 can be incorporated between the fixed-frequency oscillator 21 and the ramp generators 15, 16, in order in each case to only apply the clock signal of the oscillator 21 to that ramp generator 15, 16 which is also connected on the output side to the voltage-controlled oscillator 14, and thus to stop the counter of the respective unused ramp generator 15 or 16.

The multiple ramp generators 15, 16 and switches 17, 22 can be replaced by a single ramp generator, wherein the operating mode selection unit 18 changes between the operating modes by statically or dynamically adapting the divider factor of the frequency divider 19 between d15 and d16 as required instead of actuating the switches 17, 22. Further operating modes having further divider factors can be provided if needed.

Figure 3:
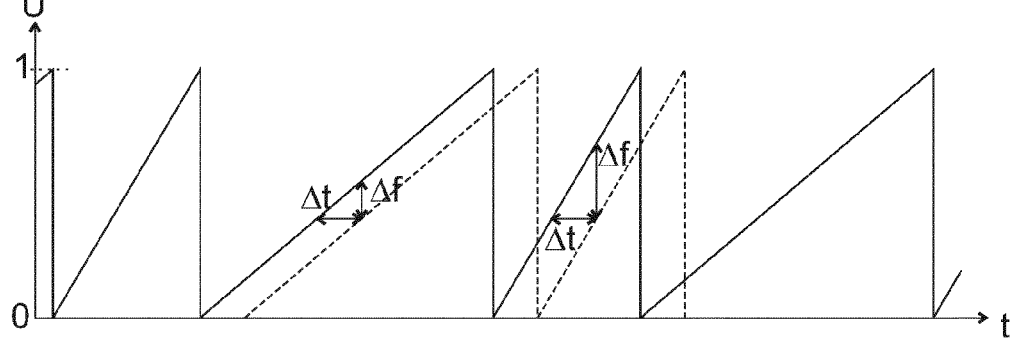
FIG. 3 shows an input signal of a voltage-controlled oscillator of the distance measuring system, according to an embodiment.

A changeover between the operating modes only takes place, optionally always takes place, if the control voltage applied to the oscillator reaches the value U=1. Simultaneously with the changeover, the control voltage goes back to U=0, whether because the output level of the ramp generator 15 or 16 now in operation has previously been kept at 0 by the switch 22, or because the control unit 18 resets the counter of the ramp generators 15, 16 upon switching over. A control voltage U is thus obtained in which ramps having different rising speeds alternate depending on the operating mode as shown in FIG. 3.

Figure 4:
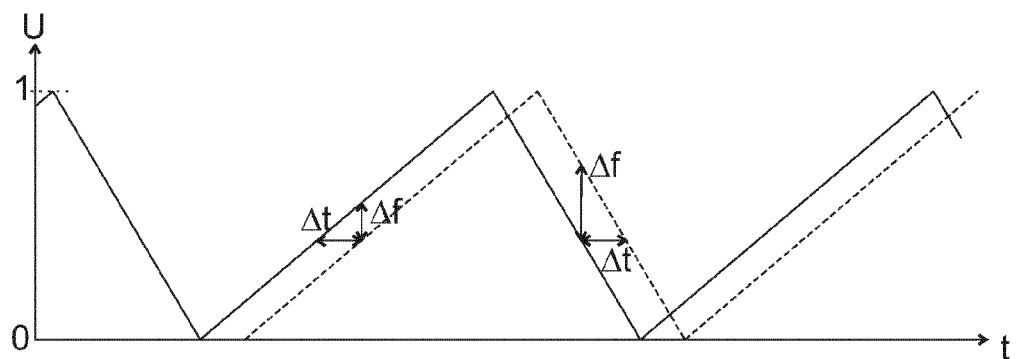
FIG. 4 shows the input signal of the voltage-controlled oscillator according to another embodiment.

Alternatively, it can be provided that if the control voltage applied to the oscillator reaches the value U=1, a switchover takes place from the first into the second operating mode, that a falling ramp is generated in the second operating mode, and that upon reaching U=0, a switch back to the first operating mode takes place. FIG. 4 shows the resulting profile of the control voltage.

An echo reflected from an object, such as the body part 12, of the scanning signal emitted by the emitter 13 is received by a receiver 23 after a runtime Δt proportional to the distance between emitter-receiver unit 9 and object. To overlay the picked-up scanning signal with the scanning signal emitted simultaneously by the emitter 13, an adding circuit 24 is provided here; the frequencies of the two scanning signals differ, as illustrated in FIG. 3 on the basis of a dashed curve, by a value Δf proportional to the slope of the ramp and the runtime Δt. The additive overlay thereof results in a beat, i.e. an output signal is obtained, the amplitude of which varies with the frequency Δf, which corresponds to the difference between the frequencies of the emitted and the received scanning signal.

Alternatively, a signal, the spectrum of which contains such a differential frequency component, could also be obtained by multiplication or further mathematical linkage of emitted and received scanning signal.

A low-pass filter 25, which only lets frequencies below the lowest frequency f0 of the emitter 13 pass, connected downstream of the adding circuit 24 is sufficient to extract this signal having the frequency Δf.

A processing unit 26 is provided to decompose the low-pass-filtered signal into its individual spectral components. For the sake of simplicity, the case will firstly be considered that only a single reflecting object is present in the spatial angle into which the emitter 13 emits and/or from which the receiver 23 receives.

$$r = \frac{c}{2} \frac{\Delta f}{\frac{df}{dt}} \quad (1)$$

The echo reflected by this object is delayed in relation to the emitted scanning signal by Δt, and if the rate of change of the frequency f of the scanning signal is $(df/dt)_1$ in the first operating mode and is $(df/dt)_2$ in the second operating mode, then in order that the ascertained distance of the object (see expression (1) above) is the same in both operating modes, the frequency difference between picked-up and emitted scanning signal, i.e. the beat frequency $\Delta f$ at the output of the adding circuit 24, has to be $(df/dt)_1 \Delta t$ in the first operating mode and $(df/dt)_2 \Delta t$ in the second operating mode, i.e., expression (2) below, has to apply, according to an embodiment. If this is not the case, a malfunction of the distance measuring system exists.

$$\frac{\Delta f_1}{\Delta f_2} = \frac{\left(\frac{df}{dt}\right)_1}{\left(\frac{df}{dt}\right)_2} \quad (2)$$

It is unimportant in this case whether the malfunction occurs in only one operating mode or in both. Even if the distance measurement should supply a correct result in one operating mode, it cannot be reliably evaluated which of the modes this is, so that none of the computed values of the distance r is trustworthy. According to a first embodiment of the invention, the processing unit 26 reacts to the existence of an error by outputting an error message to the control unit 10, whereupon it stops the movement of the robot arm 1 and/or transfers the robot arm 1 into a safe state and possibly relays the error message to a control center, in order to initiate remedying of the error.

If such an error message is not provided in a communication protocol between distance measuring system and control unit 10, the processing unit 26 can alternatively output a distance measurement result to the control unit 10 which does not have to correspond to any of the distance measured values obtained in the first or second operating mode according to formula (1), but is so low that the control unit 10 would initiate an immediate stop of the movement of the robot arm 1 or a transfer into a safe state even with proper functioning. This alternatively output measurement result can expediently be the smallest distance reliably measurable using the distance measuring system.

In practice, the possibility is to be expected that the object will move in relation to emitter 13 and receiver 23. In the simplest case, this can be taken into consideration in that a maximum speed of the object to be expected is assumed, a maximum route as a product of this speed with the time interval between a distance measurement in the first operating mode and a distance measurement in the second operating mode is computed, and the results of the two measurements are assumed to be corresponding if they do not deviate from one another by more than this maximum route.

To minimize the probability that two measurements are incorrectly evaluated as corresponding, the time interval between these measurements is to be as small as possible; therefore, first and second operating mode preferably alternate each time, as shown in FIG. 3, when the control voltage has passed through precisely one ramp completely and reaches the value U=1 at its end.

In a further embodiment variant, the distance measurement is ascertained in the first operating mode from a number of equivalent first frequency ramps, ramps having the same first slope, by the distance measurement results thereof being overlaid and/or summed or averaged. In this variant, the distance measurement in the second operating mode is also ascertained from a number of equivalent second frequency ramps, ramps having the same second slope, by the distance measurement results thereof being overlaid and/or summed or averaged. This variant takes into consideration that sometimes a significant signal of reflections from one or more objects only results after several equivalent frequency ramps, the distance measurement results of which are overlaid and/or summed.

Thus, for example, a value of 5 m/s can be assumed as a maximum speed to be expected of a person or their extremities. In the standard literature, it is assumed that the walking speed is 1.6 m/s and the speed at which arms are extended is 2 m/s. The time interval between two measurements will be 100 ms or even significantly less. As an example of how a criterion is ascertained as to whether two measurements are evaluated as corresponding, a time interval between two measurements of 100 ms and a maximum speed to be expected of 5 m/s are presumed. If the time interval between two measurements is 100 ms, the measurements are evaluated as corresponding if the results thereof differ by not more than 5 m/s*100 ms=0.5 m.

A preferred way to avoid an incorrect evaluation of the correspondence is to estimate the speed of an object on the basis of preceding distance measurements, to extrapolate the result of a preceding distance measurement on the basis of this speed, and to assume correspondence if the extrapolation result differs from the result of a present distance measurement by not more than a predetermined permissible error $\varepsilon$.

If, for example, preceding distance measurements have had the result that an object approaches at a speed of 2 m/s, the result of a preceding measurement has resulted in 1 m and the time interval between two measurements is 100 ms, the extrapolation of the preceding measurement then results in a distance of 1 m−2 m/s*100 ms=0.8 m, and correspondence with a present measurement result is assumed if the latter is in the interval [0,8−$\varepsilon$, 0,8+$\varepsilon$].

Changes of the distance between the emitter-receiver unit 9 and an object can be attributed to both a movement of the object and a movement of the emitter-receiver unit 9 in relation to the stationary base 7. According to one preferred refinement, the control unit 10 therefore continuously signals to the processing unit 26 in which direction and how fast it moves the emitter-receiver unit 9. The processing unit 26 can thus take speed changes of the emitter-receiver unit 9 into consideration during the extrapolation of a preceding distance measurement and can arrive at a more precise extrapolation result. In the above numeric example, if the measured speed thus originates from movements both of the object and of the emitter-receiver unit 9 and the speed of the emitter-receiver unit 9 reported by the control unit 10 increases by 1 m/s, a new approach speed of 3 m/s and an extrapolated distance of 0.7 m result therefrom, so that correspondence with a present measurement result is assumed if the latter is in the interval [0,7−$\varepsilon$, 0,7+$\varepsilon$].

The surroundings of the robot arm 1 will regularly contain diverse objects detectable by the distance measuring system, among them, in addition to the above-mentioned body part 12, the movement of which is not predictable by the processing unit 26, also objects 27 which do not move on their own power, but rather can be grasped and moved by a person or by the robot arm 1, completely immovable objects such as an underlying surface 28, on which the base 7 is installed, and objects, which are movable, but the location of which in relation to the emitter-receiver unit 9 of the processing unit 26 can be known a priori, among them in particular the parts of the robot arm 1 itself movable in relation to one another, the position of which can be reported to the processing unit 26 by the control unit 10. A background signal simulator 29 of the processing unit 26 is provided in order, on the basis of the known position of the robot arm 1 and known echoes of the completely immovable objects 28, to compute a contribution to the received scanning signal which is to be attributed to these objects. By this contribution being subtracted from the received scanning signal in a difference unit 30, a background-filtered scanning signal is obtained, which is to be attributed exclusively to contributions of the objects 12 movable under their own power or the objects 27 movable by external action.

Figure 5A:
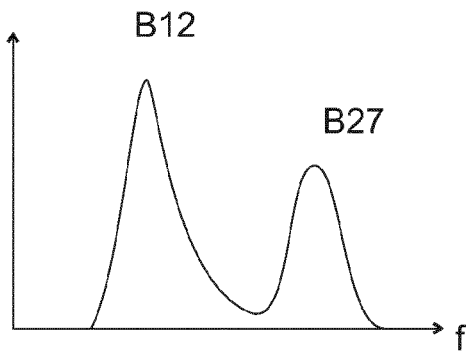
FIGS. 5a and 5b show examples of spectra of a reflected scanning signal, according to an embodiment.

In order to be able to acquire the speed of an object 12 or 27 in relation to the emitter-receiver unit 9 in surroundings which contain a plurality of objects reflecting the scanning signal, it is necessary to be able to differentiate contributions of the various objects with respect to scanning signals picked up in succession by the receiver 23 and to associate them with an object. A differentiation of the contributions of various objects is performed in the processing unit 26 on the basis of a spectral analysis of the received or the background-filtered scanning signal. FIGS. 5a and b show by way of example spectra obtained at various times of background-filtered scanning signals, which contain contributions of two objects 12, 27. The spectra contain two bands B12, B27 each centered around an intensity maximum, each of which can be attributed to one object.

Figure 5B:
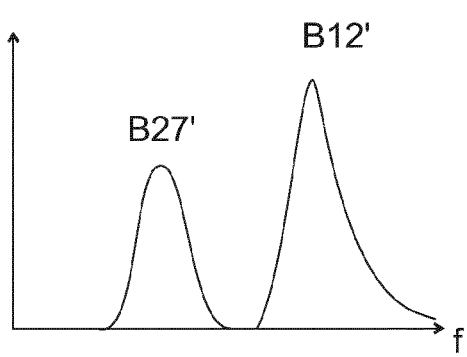

An assignment of which of these bands originates from which object is not possible solely on the basis of the frequency thereof, since the bands can switch places in the spectrum if the emitter-receiver unit 9 moves away from one object 12 and toward the other 27. The reflectivity of the objects 12, 27 does not change, however, if the objects 12, 27 move, or if a changeover takes place between first and second operating mode. The fact that such a movement has taken place between the points in time of FIGS. 5a and b, and that the lower-frequency band B12 in FIG. 5a and the higher-frequency band B12' in FIG. 5b are to be attributed to the same object can be concluded from a comparison of the intensities or also on the basis of correlations of features in the profile of both intensities of the bands B12, B27.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 1 robot arm
2 arm element
3 arm element
4 joint
5 joint
6 joint
7 base
8 tool
9 emitter-receiver unit
10 control unit
11 analysis unit
12 body part
13 emitter
14 voltage-controlled oscillator
15 ramp generator
16 ramp generator
17 switch
18 operating mode selection unit
19 frequency divider
20 counter
21 fixed-frequency oscillator
22 switch
23 receiver
24 adding circuit
25 low-pass filter
26 processing unit
27 object
28 underlying surface
29 background signal simulator
30 difference unit

What is claimed is:

1. A distance measuring system comprising:
   at least one emitter, configured to emit a frequency-variable scanning signal, in particular a radar signal,
   at least one receiver, and
   a processor for computing a distance to the object reflecting the scanning signal on the basis of a difference between the frequencies of the emitted and the received scanning signal, wherein the processor is configured to:
   cause the emitter to operate in a first mode in which the rate of change of the frequency of the scanning signal has a first finite value,
   cause the emitter to operate in a second mode in which the rate of change of the frequency of the scanning signal has a second finite value,
   compute a first distance to the object on the basis of a frequency difference between (i) the scanning signal emitted during the first mode and (ii) a reflection thereof measured by the receiver;
   compute a second distance to the object on the basis of a frequency difference between (i) the scanning signal emitted during the second mode and (ii) a reflection thereof measured by the receiver; and
   compare the computed first distance with the computed second distance and determine whether the computed first distance and the computed second distance correspond based on the comparison.

2. The distance measuring system as claimed in claim 1, wherein the processor is configured to output an error signal based on determining that the computed first distance and the computed second distance do not correspond.

3. The distance measuring system as claimed in claim 1, wherein the processor is configured to output a minimum distance measurement result based on determining that the computed first distance and the computed second distance do not correspond.

4. The distance measuring system as claimed in claim 1, wherein the processor is configured to switch between first and second operating mode.

5. The distance measuring system as claimed in claim 4, wherein the processor is configured such that the frequency in both operating modes varies between a lower limiting frequency and an upper limiting frequency and a switch between the operating modes takes place upon reaching one of the limiting frequencies.

6. A robot system comprising:
a movable implement,
processor for controlling the movement of the movable implement, and
a distance measuring system as claimed in claim 1, wherein the processor is configured to decelerate the implement based on determining that the computed first distance and the computed second distance do not correspond.

7. A distance measuring method comprising the following steps:
a) emitting a first scanning signal defining a first rate of frequency change;
b) receiving the first scanning signal reflected from a monitored object and computing a first distance to the object on the basis of a difference between the frequencies of the emitted and the received first scanning signal;
c) emitting a second scanning signal defining a second rate of frequency change;
d) receiving the second scanning signal reflected from the monitored object and computing a second distance to the object on the basis of a difference between the frequencies of the emitted and the received second scanning signal;
e) comparing the computed first distance with the computed second distance and determining whether the computed first distance and the computed second distance correspond.

8. The distance measuring method as claimed in claim 7, wherein an error signal is output based on determining that the computed first distance and the computed second distance do not correspond.

9. The distance measuring method as claimed in claim 7, wherein a minimum distance result is output based on determining that the computed first distance and the computed second distance do not correspond, wherein the minimum distance result is smaller than both the computed first and second distances.

10. The distance measuring method as claimed in claim 7, wherein a speed of the monitored object is estimated on the basis of successive measurements of the distance to the object and taken into consideration when determining whether the first and second distances correspond.

11. The distance measuring method as claimed in claim 7 wherein, in step d), among reflected signals originating from various objects, one is only identified as originating from the monitored object if the strength ratio of this one signal corresponds to the scanning signal emitted in step c) having the strength ratio of the scanning signal received in step b) to the scanning signal emitted in step a).

12. The distance measuring method as claimed in claim 11, wherein the reflected scanning signal is overlaid with the emitted scanning signal, and in that different spectral bands of the overlaying result are identified as reflected signals of various objects.

13. The distance measuring method as claimed in claim 7, wherein the frequency of the scanning signal is tuned precisely once or multiple times from a first interval limit to a second interval limit in step a) and/or in step c).

14. The distance measuring method as claimed in claim 13, wherein at least one of the interval limits in step a) and in step c) is the same.

15. The distance measuring method as claimed in claim 13, wherein both interval limits in step a) and in step c) are the same.

16. The distance measuring method as claimed in claim 7, comprising:
decelerating an arm of a robot based on determining that the computed first distance and the computed second distance do not correspond.

17. The distance measuring system of claim 1, wherein the processor is configured to determine whether the computed first distance and the computed second distance correspond based on a projected speed of the object and difference in time between the first and the second distance computations.

* * * * *